(12) United States Patent
Mergen et al.

(10) Patent No.: US 7,675,962 B2
(45) Date of Patent: Mar. 9, 2010

(54) METHOD AND APPARATUS FOR DERIVING A CHANNEL IMPULSE RESPONSE ESTIMATE FOR A WIRELESS CHANNEL

(75) Inventors: Gokhan Mergen, Campbell, CA (US); Vignesh Suthuraman, Campbell, CA (US); Nitin Kasturi, Los Gatos, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 886 days.

(21) Appl. No.: 11/399,886

(22) Filed: Apr. 7, 2006

(65) Prior Publication Data

US 2007/0110127 A1    May 17, 2007

Related U.S. Application Data

(60) Provisional application No. 60/737,454, filed on Nov. 15, 2005.

(51) Int. Cl.
 *H04B 1/00* (2006.01)
(52) U.S. Cl. .................. 375/147; 375/229; 375/316
(58) Field of Classification Search ............. 375/142, 375/144, 147, 148, 150, 229, 232, 316, 343
See application file for complete search history.

(56) References Cited

U.S. PATENT DOCUMENTS

| 6,907,092 | B1 | 6/2005 | Yakhnich et al. | |
|---|---|---|---|---|
| 7,065,371 | B1* | 6/2006 | Kleinerman | 455/464 |
| 2003/0231725 | A1* | 12/2003 | Scarpa | 375/350 |
| 2005/0157801 | A1 | 7/2005 | Gore et al. | |
| 2005/0207508 | A1* | 9/2005 | Singh et al. | 375/267 |
| 2006/0072485 | A1* | 4/2006 | Cairns et al. | 370/290 |

FOREIGN PATENT DOCUMENTS

| EP | 1065801 A1 | 1/2001 |
|---|---|---|
| EP | 1128563 A1 | 8/2001 |
| WO | WO 199960729 A1 | 11/1999 |
| WO | 2005013530 A2 | 2/2001 |

* cited by examiner

Primary Examiner—David B Lugo
(74) Attorney, Agent, or Firm—Jiayu Xu (57) ABSTRACT

Techniques for deriving a channel impulse response estimate (CIRE) having improved quality are described. A first CIRE with multiple channel taps is obtained based on (1) an initial CIRE derived from a received pilot or (2) a filtered CIRE derived from the initial CIRE. In one aspect, the channel taps in the first CIRE are scaled with multiple scaling factors to obtain a second CIRE. For point-wise LMMSE scaling, the energy of each channel tap is estimated. The noise energy for the channel taps is also estimated, e.g., based on energies of channel taps on one or both edges of the first CIRE. Each channel tap is scaled based on a scaling factor determined by the energy of that channel tap and the noise energy. Each channel tap with energy below a threshold may be set to zero. In another aspect, the second CIRE is obtained by zeroing out selected ones of the channel taps in the first CIRE.

31 Claims, 8 Drawing Sheets

METHOD AND APPARATUS FOR DERIVING A CHANNEL IMPULSE RESPONSE ESTIMATE FOR A WIRELESS CHANNEL

The present application claims priority to provisional U.S. Application Ser. No. 60/737,454, entitled "LMMSE Based Methods for Improvement of Channel Impulse Response Estimates in a WCDMA Downlink," filed Nov. 15, 2005, assigned to the assignee hereof and incorporated herein by reference.

BACKGROUND

I. Field

The present disclosure relates generally to communication, and more specifically to techniques for deriving a channel estimate for a wireless channel.

II. Background

In a wireless communication system, a transmitter typically processes (e.g., encodes, interleaves, and symbol maps) traffic data to generate data symbols, which are modulation symbols for data. For a coherent system, the transmitter multiplexes pilot symbols with the data symbols, processes the multiplexed data and pilot symbols to generate a radio frequency (RF) signal, and transmits this RF signal via a wireless channel. The wireless channel distorts the transmitted RF signal with a channel response and further degrades the signal with noise and interference.

A receiver receives the transmitted RF signal and processes the received RF signal to obtain input samples. For coherent data detection, the receiver estimates the response of the wireless channel based on the received pilot and derives a channel estimate. The receiver then performs data detection (e.g., equalization) on the input samples with the channel estimate to obtain symbol estimates, which are estimates of the data symbols transmitted by the transmitter. The receiver then processes (e.g., demodulates, deinterleaves, and decodes) the symbol estimates to obtain decoded data.

The quality of the channel estimate may have a large impact on data detection performance and may affect the quality of the symbol estimates as well as the reliability of the decoded data. There is therefore a need in the art for techniques to derive a high quality channel estimate in a wireless communication system.

SUMMARY

Techniques for deriving a channel impulse response estimate (CIRE) having improved quality are described herein. A CIRE is an estimate of a time-domain response of a communication channel. A CIRE may be given by a set of channel taps.

In one aspect, a CIRE is derived by scaling channel taps, e.g., based on a point-wise linear minimum mean square error (LMMSE) technique. An initial CIRE is derived based on a received pilot, e.g., in the time domain by despreading input samples with a pilot sequence. The initial CIRE may be filtered to obtain a filtered CIRE. A first CIRE with multiple channel taps is derived based on the initial CIRE or the filtered CIRE. The channel taps in the first CIRE are scaled with multiple scaling factors to obtain a second CIRE. For point-wise LMMSE scaling, the energy of each channel tap in the first CIRE is estimated. The noise energy for the channel taps in the first CIRE is also estimated, e.g., based on the energies of a small number of channel taps on the left edge and/or right edge of the first CIRE. Each channel tap in the first CIRE is then scaled based on a scaling factor determined by the energy of that channel tap and the noise energy. Each channel tap with energy below a threshold $T_h$ may be set to zero. The threshold $T_h$ may be set based on the noise energy or a predetermined value.

In another aspect, the second CIRE is obtained by zeroing out selected ones of the channel taps in the first CIRE. In one embodiment, a first subset of channel taps on the left edge of the first CIRE is set to zero if the aggregate energy for these channel taps is below a first threshold $T_{left}$. A second subset of channel taps on the right edge of the first CIRE is also set to zero if the aggregate energy for these channel taps is below a second threshold $T_{right}$. The first and second thresholds may be set based on the total energy $E_{total}$ of the channel taps in the first CIRE. In other embodiments, at least one channel tap having aggregate energy less than a threshold $T_{acc}$ is set to zero. The threshold $T_{acc}$ may be set based on $E_{total}$. The channel tap(s) to be zeroed out may be selected in a predetermined order, alternating between the left and right edges of the first CIRE, and traversing from the two ends toward the middle. Alternatively, the channel taps in the first CIRE may be ranked from weakest to strongest, and the channel tap(s) to be zeroed out may be selected in a sequential order starting with the weakest channel tap. In yet another embodiment, each channel tap in the first CIRE having energy less than a threshold $T_h$ is set to zero. The threshold $T_h$ may be set based on the noise energy, the peak energy, or the total energy of the channel taps in the first CIRE.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
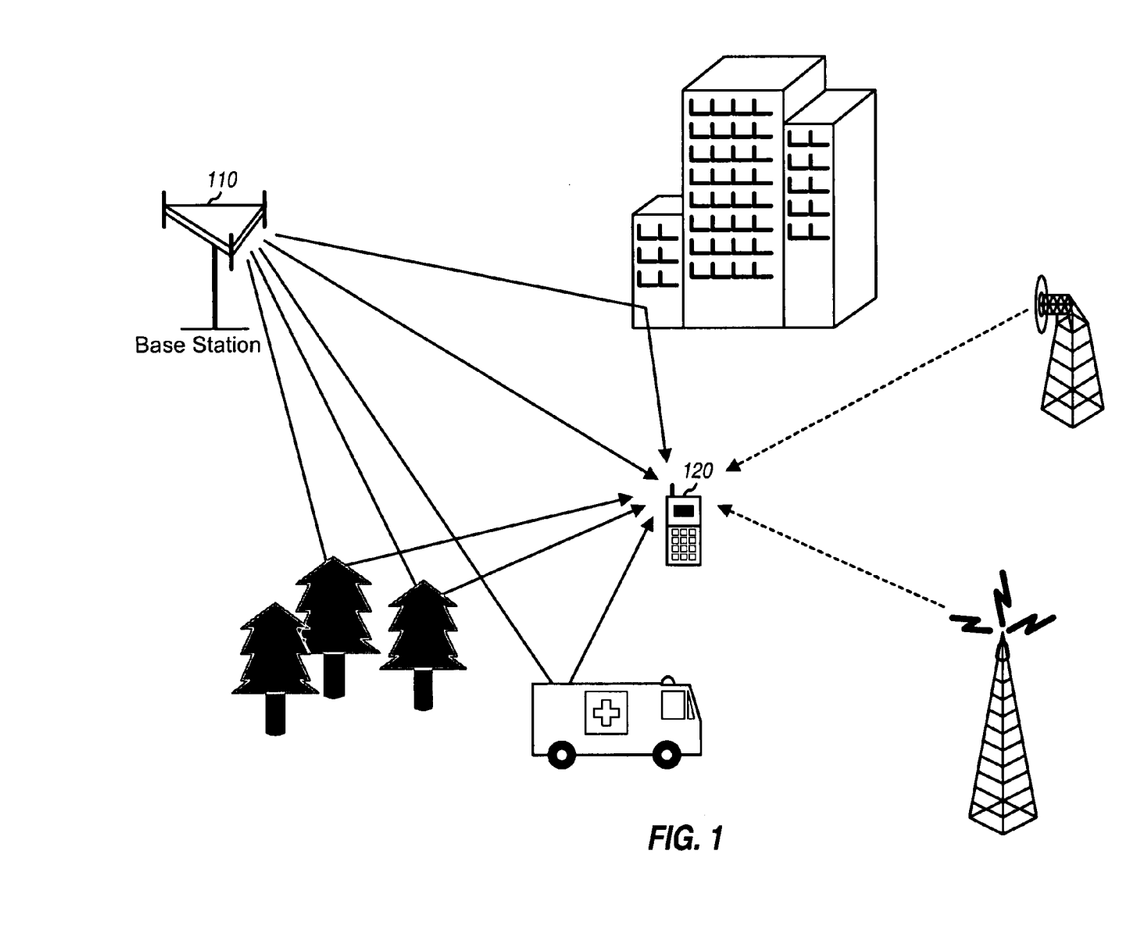
FIG. 1 shows a transmission in a wireless communication system.

FIG. 1 shows an exemplary transmission in a wireless communication system. For simplicity, FIG. 1 shows only one base station 110 and one wireless device 120. A base station is generally a fixed station that communicates with the wireless devices and may also be called a Node B, an access point, or some other terminology. A wireless device may be fixed or mobile and may also be called a user equipment (UE), a mobile station, a user terminal, a subscriber unit, or some other terminology. A wireless device may be a cellular phone, a personal digital assistant (PDA), a wireless modem card, or some other device or apparatus.

Base station 110 transmits an RF signal to wireless device 120. This RF signal may reach wireless device 120 via one or more signal paths, which may include a direct path and/or reflected paths. The reflected paths are created by reflections of radio waves due to obstructions (e.g., buildings, trees, vehicles, and other structures) in the wireless environment. Wireless device 120 may receive multiple instances or copies of the transmitted RF signal. Each received signal instance is obtained via a different signal path and has a particular complex gain and a particular time delay determined by that signal path. The received RF signal at wireless device 120 is a superposition of all received signal instances at the wireless device. Wireless device 120 may also receive interfering transmissions from other transmitting stations. The interfering transmissions are shown by dashed lines in FIG. 1.

The channel estimation techniques described herein may be used for various communication systems such as a Code Division Multiple Access (CDMA) system, a Time Division Multiple Access (TDMA) system, a Frequency Division Multiple Access (FDMA) system, an orthogonal frequency division multiple access (OFDMA) system, a single-carrier FDMA (SC-FDMA) system, and so on. A CDMA system may implement one or more radio access technologies (RATs) such as Wideband-CDMA (W-CDMA), cdma2000, and so on. cdma2000 covers IS-2000, IS-856, and IS-95 standards. A TDMA system may implement a RAT such as Global System for Mobile Communications (GSM). These various RATs and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. An OFDMA system transmits modulation symbols in the frequency domain on orthogonal frequency subcarriers using OFDM. An SC-FDMA system transmits modulation symbols in the time domain on orthogonal frequency subcarriers.

The channel estimation techniques described herein may be used for a wireless device as well as a base station. For clarity, these techniques are described below for a wireless device in a CDMA system, which may be a W-CDMA system or a cdma2000 system. Certain portions of the description are for a W-CDMA system.

Figure 2:
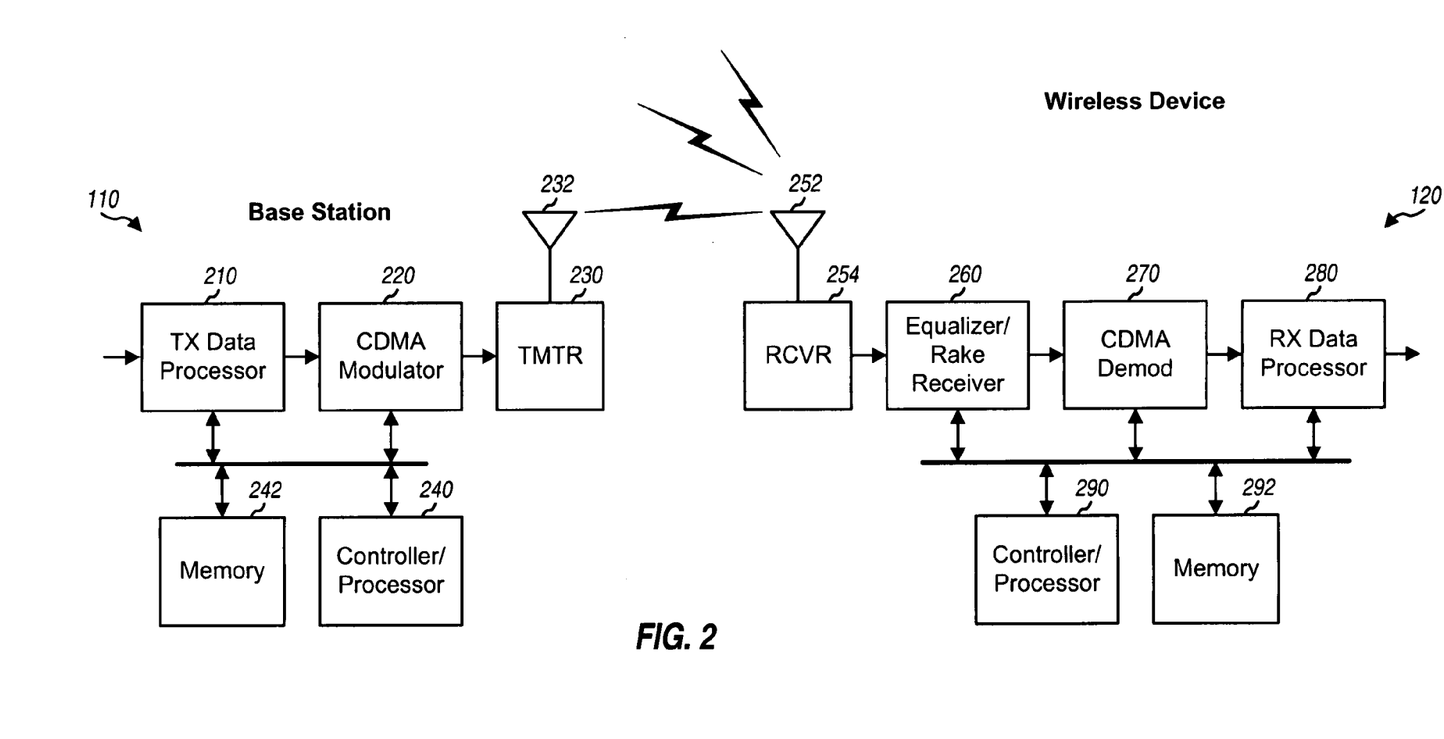
FIG. 2 shows a block diagram of a base station and a wireless device.

FIG. 2 shows a block diagram of base station 110 and wireless device 120. At base station 110, a transmit (TX) data processor 210 receives traffic data for the wireless devices being served and processes (e.g., encodes, interleaves, and symbol maps) the traffic data to generate data symbols. As used herein, a data symbol is a modulation symbol for data, a pilot symbol is a modulation symbol for pilot, a modulation symbol is a complex value for a point in a signal constellation (e.g., for M-PSK, M-QAM, and so on), and pilot is data that is known a priori by both the base station and the wireless device. A CDMA modulator 220 processes the data symbols and pilot symbols as described below and provides output chips to a transmitter (TMTR) 230. Transmitter 230 processes (e.g., converts to analog, amplifies, filters, and frequency upconverts) the output chips and generates an RF signal, which is transmitted from an antenna 232.

At wireless device 120, an antenna 252 receives the transmitted RF signal via direct and/or reflected paths and provides a received RF signal to a receiver (RCVR) 254. Receiver 254 processes (e.g., filters, amplifies, frequency downconverts, and digitizes) the received RF signal to obtain received samples. Receiver 254 may also perform pre-processing on the received samples and provides input samples to an equalizer/rake receiver 260. The pre-processing may include, e.g., automatic gain control (AGC), frequency correction, digital filtering, sample rate conversion, and so on. Equalizer/rake receiver 260 processes the input samples (e.g., with an equalizer or a rake receiver) and provides output samples. A CDMA demodulator (Demod) 270 processes the output samples in a manner complementary to the processing by CDMA modulator 220 and provides symbol estimates, which are estimates of the data symbols sent by base station 110 to wireless device 120. The rake receiver and CDMA demodulator may also be combined. A receive (RX) data processor 280 processes (e.g., symbol demaps, deinterleaves, and decodes) the symbol estimates and provides decoded data. In general, the processing by CDMA demodulator 270 and RX data processor 280 is complementary to the processing by CDMA modulator 220 and TX data processor 210, respectively, at base station 110.

Controllers/processors 240 and 290 direct operation of various processing units at base station 110 and wireless device 120, respectively. Memories 242 and 292 store data and program codes for base station 110 and wireless device 120, respectively.

Figure 3:
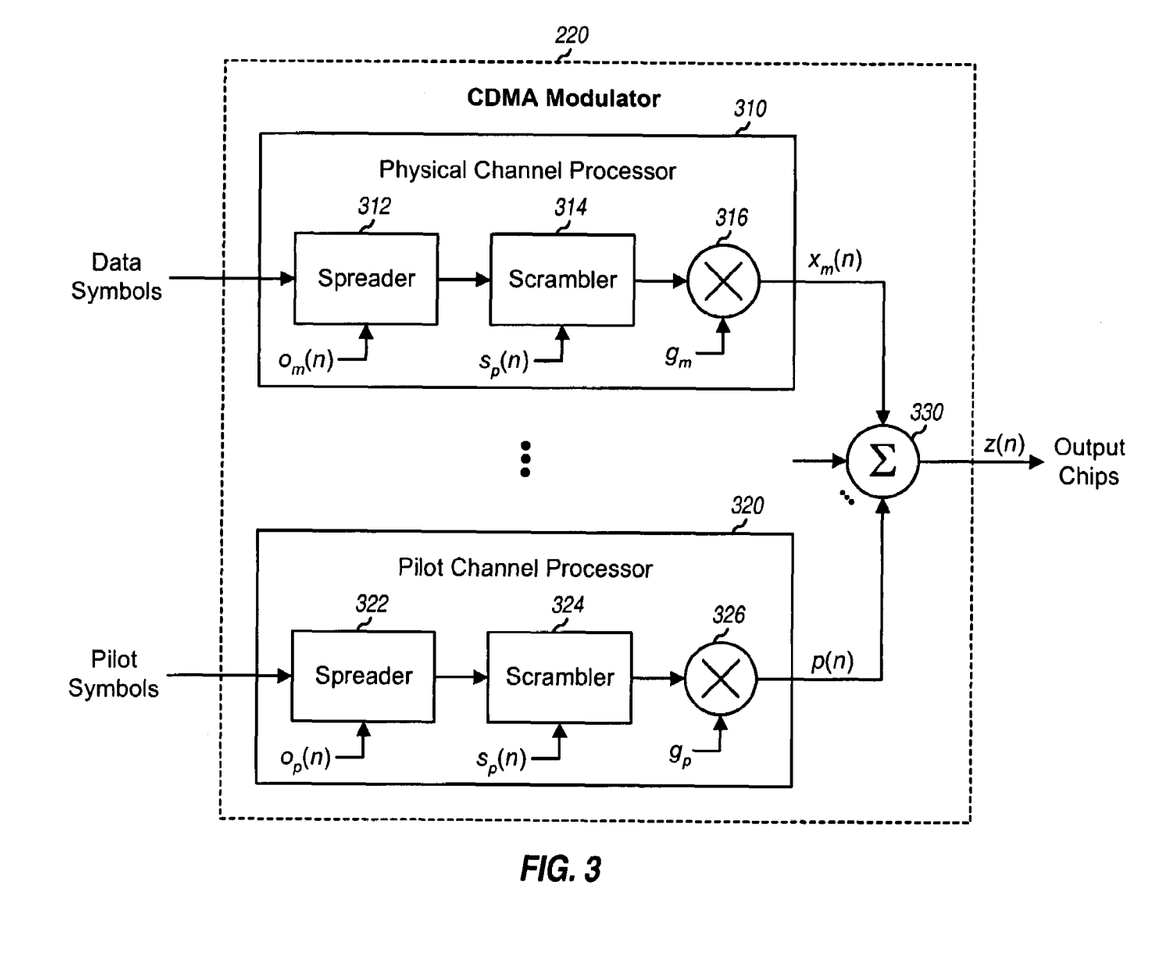
FIG. 3 shows a block diagram of a CDMA modulator at the base station.

FIG. 3 shows a block diagram of CDMA modulator 220 at base station 110. For clarity, the following description is for W-CDMA. CDMA modulator 220 includes a physical channel processor 310 for each physical channel used for traffic data and a pilot channel processor 320 for pilot. Within processor 310 for physical channel m, a spreader 312 spreads data symbols with an orthogonal variable spreading factor (OVSF) code $o_m(n)$ for physical channel m and provides data chips. A scrambler 314 multiplies the data chips with a scrambling sequence $s_p(n)$ for base station 110. A multiplier 316 scales the output of scrambler 314 with a gain $g_m$ and provides output chips $x_m(n)$ for physical channel m.

Within pilot channel processor 320, a spreader 322 spreads pilot symbols with an OVSF code $o_p(n)$ for pilot, which is a sequence of all zeros, and provides pilot chips. A scrambler 324 multiplies the pilot chips with the scrambling sequence $s_p(n)$. A multiplier 326 scales the output of scrambler 324 with a gain $g_p$ and provides output chips $p(n)$ for the pilot channel. A summer 330 sums the output chips for all physical channels and provides output chips $z(n)$ for base station 110.

At wireless device 120, the input samples from receiver 254 may be expressed as:

$$y(n) = h(n) \otimes [x_m(n) + p(n)] + w(n) \quad \text{Eq (1)}$$
$$= \sum_{i=-\infty}^{\infty} h(i) \cdot [x_m(n-i) + p(n-i)] + w(n)$$

where $x_m(n)$ is the signal component of interest for wireless device 120, $p(n)$ is the pilot from base station 110, $h(n)$ is an impulse response of the wireless channel between base station 110 and wireless device 120, $w(n)$ is the total noise and interference observed by $x_m(n)$ and $p(n)$, $y(n)$ is the input samples at wireless device 120, and $\otimes$ denotes a convolution.

The input samples y(n) may be processed with an equalizer to obtain an estimate of the desired signal $x_m(n)$.

Figure 4:
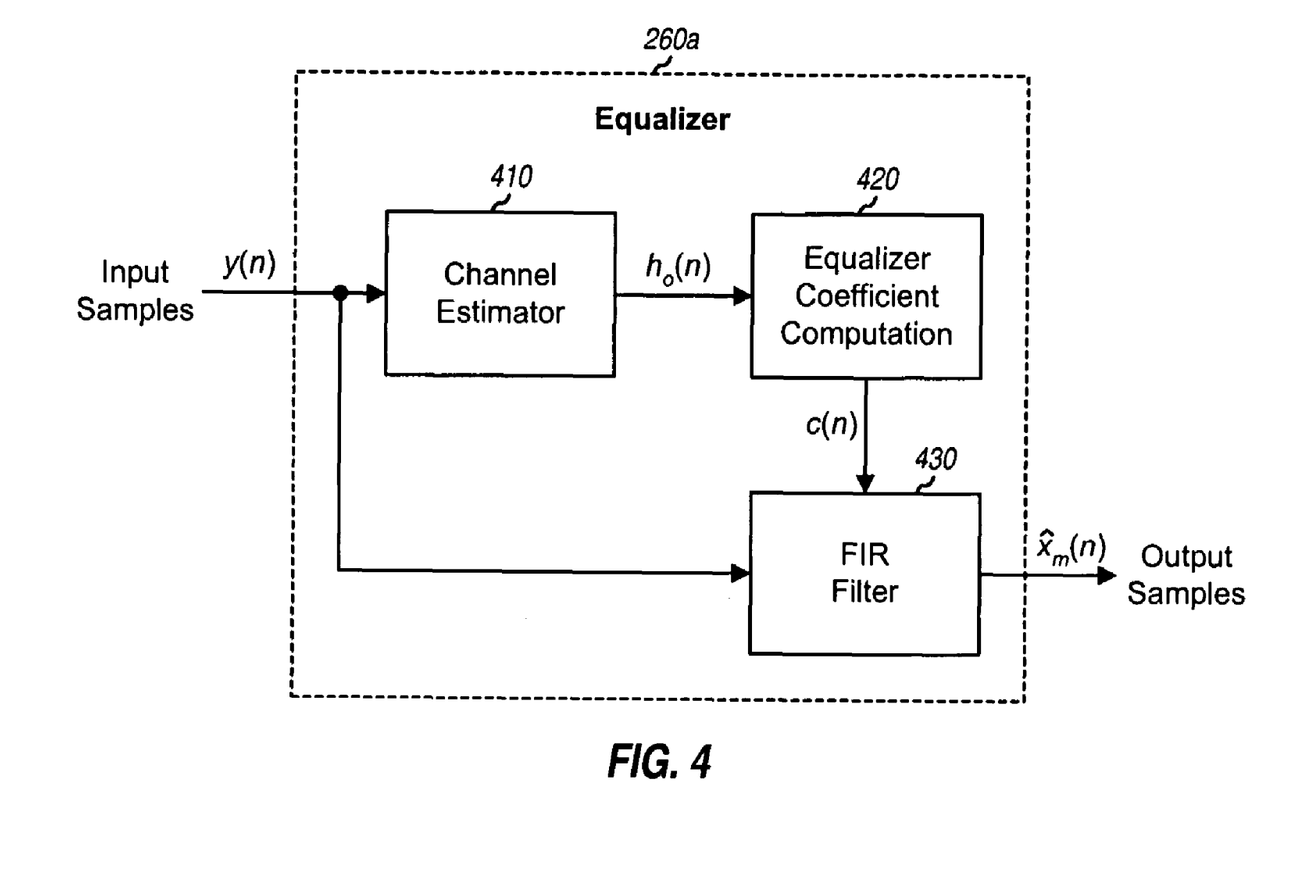
FIG. 4 shows a block diagram of an equalizer at the wireless device.

FIG. 4 shows a block diagram of an equalizer 260a, which is an embodiment of equalizer/rake receiver 260 in FIG. 2. For this embodiment, the input samples y(n) from receiver 254 are provided to a channel estimator 410 and a finite impulse response (FIR) filter 430. Channel estimator 410 derives a channel impulse response estimate (CIRE) $h_o(n)$ for the wireless channel between base station 110 and wireless device 120. A computation unit 420 receives the CIRE $h_o(n)$ and derives equalizer coefficients c(n) based on this CIRE $h_o(n)$, e.g., using LMMSE, least mean square (LMS), recursive least square (RLS), direct matrix inversion (DMI), zero-forcing, or some other technique. FIR filter 430 filters the input samples y(n) with the equalizer coefficients c(n) and provides output samples $\hat{x}_m(n)$, which are estimates of the desired output chips $x_m(n)$.

Channel estimator 410 may derive an initial CIRE based on a pilot received from base station 110. In an embodiment, the initial CIRE may be derived as follows:

$$\hat{h}(n) = \frac{1}{K} \cdot \sum_{i=0}^{K-1} y(n+i) \cdot p^*(i), \quad \text{Eq (2)}$$

for $n = 1, \ldots, L,$ where $\hat{h}(n)$ is an initial estimate of an actual channel tap h(n) for index n, K is the accumulation length, and "*" denotes a complex conjugate.

In equation (2), channel tap h(n) at index n is estimated by performing despreading in the time domain with a pilot sequence. The despreading may be achieved by multiplying the input samples y(n) with the complex conjugated pilot chips p*(n) and accumulating the results over K chips. K is an integer multiple of the length of the orthogonal code used for the pilot. The OVSF code for the pilot in W-CDMA has a length of 256 chips, and the Walsh code for the pilot in cdma2000 has a length of 128 chips. K may be set to one pilot symbol, multiple pilot symbols, one slot, multiple slots, and so on. A slot covers 2560 chips in W-CDMA and 768 chips in cdma2000.

Figure 5:
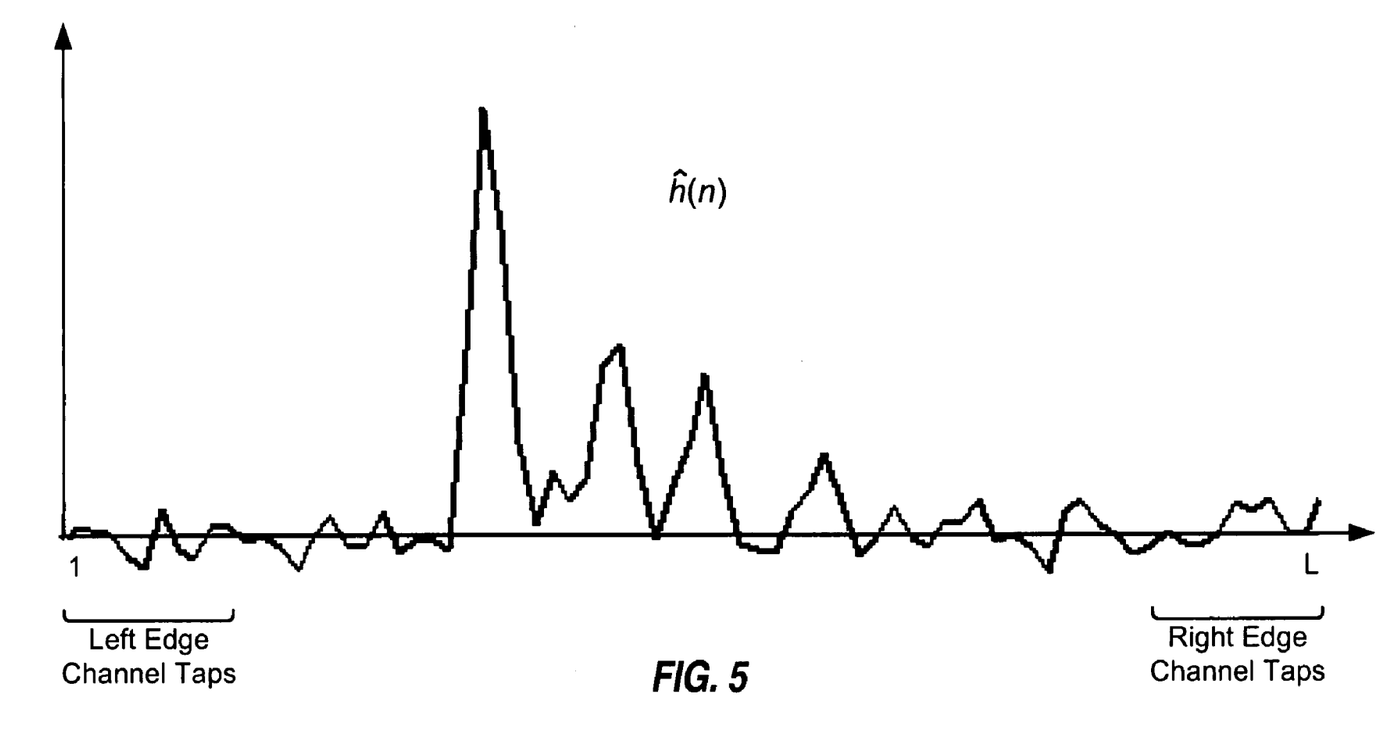
FIG. 5 shows an exemplary channel impulse response estimate.

FIG. 5 shows an exemplary initial CIRE for the wireless channel between base station 110 and wireless device 120. The initial CIRE contains L channel taps. Each channel tap has a particular complex gain and a particular time delay, both of which are determined by the wireless environment. Each channel tap is associated with a different signal path or multipath. The difference between the earliest channel tap and the latest channel tap is referred to as the channel delay spread. A "long" channel with reflections from far away objects has a long delay spread. L may be selected to be greater than or equal to the longest expected delay spread for the system. In this case, the actual delay spread may be much shorter than L in many instances. Furthermore, many of the channel taps may contain all or mostly noise and little or no useful energy.

The initial CIRE contains estimation errors and noise. It can be shown that for a pure noise tap with h(n)=0, the corresponding initial channel tap $\hat{h}(n)$ has noise energy of $I_o/(K \cdot E_p)$, where $I_o$ is the total received energy at wireless device 120 and $E_p$ is the energy-per-chip for the pilot transmitted by base station 110. Furthermore, it can be shown that a weak channel tap observes more noise than a stronger channel tap. Various techniques may be used to improve the initial CIRE. These techniques may be applied individually or in combination.

The initial CIRE may be filtered across multiple update intervals to reduce noise. In an embodiment, the filtering is performed separately for each channel tap based on a 1-tap infinite impulse response (IIR) filter, as follows:

$$\tilde{h}_t(n) = \alpha_h \cdot \hat{h}(n) + (1-\alpha_h) \cdot \tilde{h}_{t-1}(n), \text{ for n=1, \ldots, L,} \quad \text{Eq (3)}$$

where $\tilde{h}_t(n)$ is a filtered channel tap at index n for update interval t, and $\alpha_h$ is an IIR filter coefficient that determines the amount of filtering.

In general, $1 > \alpha_h > 0$, with a larger $\alpha_h$ corresponding to less filtering, and vice versa. For example, $\alpha_h$ may be set within a range of 0.15 to 0.5. $\alpha_h$ may be a fixed value or a configurable value and may be selected to provide good performance. The filtering in equation (3) reduces noise. The filtering may also be performed in other manners and with other types of filter. For simplicity, index t is omitted in the following description, and $\tilde{h}(n)$ denotes the filtered channel taps for the current update interval.

In an embodiment, the initial channel taps $\hat{h}(n)$ are used as input channel taps $h_i(n)$ for a first CIRE, or $h_i(n) = \hat{h}(n)$, to derive output channel taps $h_o(n)$ for a second CIRE having improved quality. In another embodiment, the filtered channel taps $\tilde{h}(n)$ are used as input channel taps $h_i(n)$, or $h_i(n) = \tilde{h}(n)$, to derive output channel taps $h_o(n)$. For both embodiments, the output channel taps $h_o(n)$ may or may not be filtered. The output channel taps may be derived based on various post-processing schemes.

In one post-processing scheme, the output channel taps in the second CIRE are obtained by scaling the input channel taps in the first CIRE. The input channel taps $h_i(n)$ may be expressed as:

$$h_i(n) = h(n) + w_i(n), \text{ for n=1, \ldots, L,} \quad \text{Eq (4)}$$

where $w_i(n)$ is the estimation errors and noise (or simply, the noise) for input channel tap $h_i(n)$. For simplicity, the noise $w_i(n)$ may be assumed to be zero mean with a variance of $\sigma_h^2$. It can be shown that the noise variance is similar for all L input channel taps $h_i(n)$ and may thus be represented by $\sigma_h^2$, which is not a function of tap index n. This noise property may be exploited to derive output channel taps having improved quality, as described below.

An improved estimate of the actual channel tap h(n) may be derived based on a point-wise LMMSE technique or some other technique. Point-wise LMMSE refers to application of the LMMSE technique on a tap-by-tap basis. A point-wise LMMSE estimate of h(n) may be expressed as:

$$h_o(n) = \frac{\mathcal{E}\{|h(n)|^2\}}{\mathcal{E}\{|h_i(n)|^2\}} \cdot h_i(n), \quad \text{Eq (5)}$$

$$= \frac{\mathcal{E}\{|h_i(n)|^2\} - \sigma_h^2}{\mathcal{E}\{|h_i(n)|^2\}} \cdot h_i(n),$$

for $n = 1, \ldots, L,$ $$= \left(1 - \frac{\sigma_h^2}{\mathcal{E}\{|h_i(n)|^2\}}\right) \cdot h_i(n),$$

where $\mathcal{E}\{\ \}$ denotes an expectation operation, $\mathcal{E}\{|h(n)|^2\}$ is the expected energy of actual channel tap h(n), $\mathcal{E}\{|h_i(n)|^2\}$ is the expected energy of input channel tap $h_i(n)$, and $h_o(n)$ is an output channel tap that is a point-wise LMMSE estimate of $h(n)$.

Equation (5) provides the "best" linear estimate of $h(n)$ from a noisy estimate $h_i(n)$, where "best" is used in the sense of minimum mean square error in estimation, so that $h_o(n)$ yields a minimum value for $\mathcal{E}\{|h_o(n)-h_i(n)|^2\}$. Equation (5) indicates that the best linear estimate of $h(n)$ is given by a scaled version of $h_i(n)$, where the scaling factor is determined by $\mathcal{E}\{|h_i(n)|^2\}$ and $\sigma_h^2$. The quantities $\mathcal{E}\{|h_i(n)|^2\}$ and $\sigma_h^2$ may be estimated as described below.

The energy of input channel tap $h_i(n)$ may be estimated in various manners. In an embodiment, the channel tap energy is estimated by computing the square magnitude of the input channel tap, as follows:

$$E(n)=|h_i(n)|^2, \text{ for } n=1,\ldots,L, \quad \text{Eq (6)}$$

where $E(n)$ is the estimated energy of input channel tap $h_i(n)$.

In another embodiment, the channel tap energy is estimated by computing the square magnitude of the input channel tap for each update interval and averaging over multiple update intervals. The averaging may be achieved with a 1-tap IIR filter, as follows:

$$E_t(n)=\alpha_e\cdot|h_i(n)|^2+(1-\alpha_e)\cdot E_{t-1}(n), \text{ for } n=1,\ldots,L, \quad \text{Eq (7)}$$

where $E_t(n)$ is the estimated energy of input channel tap $h_i(n)$ for update interval t, and $\alpha_e$ is an IIR filter coefficient for the channel tap energy.

Coefficient $\alpha_e$ may be a fixed value or a configurable value and may be selected to achieve good performance. For example, $\alpha_e$ may be set to 0.5 or some other value.

The channel tap energy may also be estimated in other manners. In the following description, $E(n)$ denotes the estimated energy of input channel tap $h_i(n)$. $E(n)$ may be derived as shown in equation (6) or (7) or based on some other equation.

The noise variance $\sigma_h^2$, which is also referred to as the noise energy, may be estimated in various manners. The length of the first CIRE may be selected to be sufficiently long so that at least one edge can be expected to contain pure or mostly noise taps. The non-zero channel taps may be centered so that both edges of the first CIRE can be expected to contain pure or mostly noise taps. This centering may be achieved by (1) computing the center of weight of the channel taps in the first CIRE and (2) placing the center of weight at or near index L/2. The noise energy may then be estimated based on the noise taps on one or both edges of the first CIRE.

In an embodiment, the noise energy is estimated by averaging the energies of Q leftmost channel taps and Q rightmost channel taps of the first CIRE, as follows:

$$E_l = \frac{1}{Q}\cdot\sum_{n=1}^{Q} E(n), \quad \text{Eq (8)}$$

$$E_r = \frac{1}{Q}\cdot\sum_{n=L-Q+1}^{L} E(n), \text{ and} \quad \text{Eq (9)}$$

$$E_{noise} = \frac{1}{2}(E_l + E_r), \quad \text{Eq (10)}$$

where $E_l$ is the average energy of the Q leftmost channel taps with indices 1 through Q, $E_r$ is the average energy of the Q rightmost channel taps with indices L-Q+1 through L, and $E_{noise}$ is the estimated noise energy. In general, Q and L may be any suitable values. As an example, L may be equal to 64, and Q may be equal to four.

In another embodiment, the noise energy is estimated by taking the minimum of $E_l$ and $E_r$, as follows:

$$E_{noise}=\eta\cdot\min\{E_l,E_r\}, \quad \text{Eq (11)}$$

where $\eta$ is a scaling factor used to account for the fact that taking the minimum of $E_l$ and $E_r$ statistically yields a smaller estimate of the true noise energy. For example, $\eta$ may be set to 1.3 or some other value. This embodiment is more robust when the non-zero channel taps are not centered in the first CIRE.

In yet another embodiment, the noise energy $E_{noise}$ is a programmable value and is not computed based on a noisy estimate of $h(n)$. In the following description, $E_{noise}$ denotes the estimated noise energy for input channel tap $h_i(n)$ used to derive output channel tap $h_o(n)$.

In one embodiment, each input channel tap is scaled based on the point-wise LMMSE technique. For this embodiment, the output channel taps may be derived as follows:

$$h_o(n) = \left(1 - \frac{E_{noise}}{E(n)}\right)\cdot h_i(n) \quad \text{Eq (12)}$$

for $n = 1, \ldots, L$.

In the embodiment shown in equation (12), each input channel tap $h_i(n)$ is scaled based on a scaling factor determined by the energy $E(n)$ of that channel tap and the noise energy $E_{noise}$.

In another embodiment, each input channel tap is scaled based on the point-wise LMMSE technique if that tap is sufficiently strong and is zeroed out otherwise. An input channel tap may be considered to be sufficiently strong if its energy exceeds a threshold $T_h$. For this embodiment, the output channel taps may be derived as follows:

$$h_o(n) = \begin{cases} \left(1 - \frac{E_{noise}}{E(n)}\right)\cdot h_i(n) & \text{if } E(n) > T_h \\ 0 & \text{otherwise} \end{cases} \quad \text{Eq (13)}$$

for $n = 1, \ldots, L$.

The threshold $T_h$ may be set based on the noise energy $E_{noise}$, the total energy, and so on. For example, $T_h$ may be set as $T_h=\beta_h\cdot E_{noise}$, where $\beta_h$ may be set to 1.5 or some other value. $T_h$ may also be a programmable value.

The input channel taps may also be scaled in other manners. For example, the input channel taps may be scaled based on some other technique instead of the point-wise LMMSE technique. The input channel taps may also be scaled jointly. For this embodiment, correlation across multiple channel taps may be determined and used to scale the channel taps.

Figure 6:
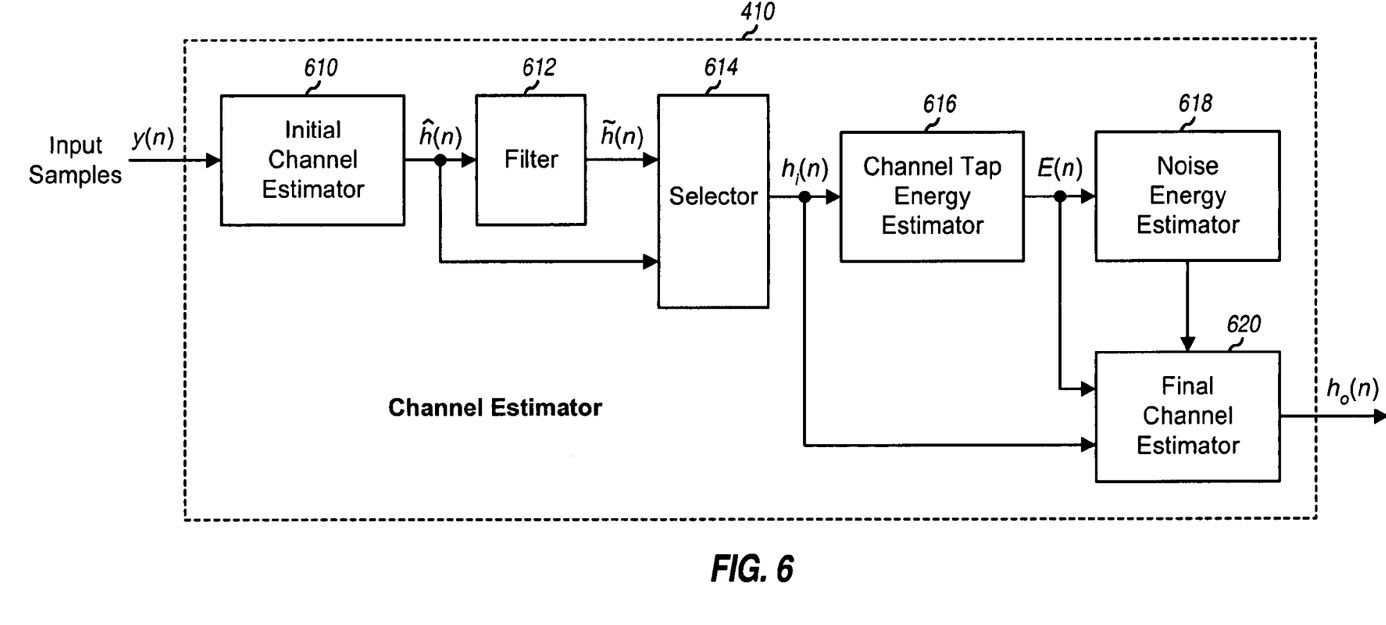
FIG. 6 shows a block diagram of a channel estimator.

FIG. 6 shows a block diagram of an embodiment of channel estimator 410 for the first post-processing scheme. An initial channel estimator 610 receives the input samples y(n) and derives an initial CIRE, e.g., as shown in equation (2). A filter 612 filters the channel taps ĥ(n) in the initial CIRE, e.g., as shown in equation (3), and provides filtered channel taps h̃(n). A selector 614 provides the initial channel taps ĥ(n) or the filtered channel taps h̃(n) as input channel taps $h_i(n)$ for a first CIRE. For example, selector 614 may provide the initial channel taps h̃(n) for a fast varying channel and may provide the filtered channel taps h̃(n) for a slowly varying channel.

A channel tap energy estimator 616 estimates the energy E(n) of each input channel tap, e.g., as shown in equation (6) or (7). A noise energy estimator 618 estimates the noise energy $E_{noise}$ for the input channel taps, e.g., based on the energies of a small number of input channel taps on one or both edges of the first CIRE as shown in equation (10) or (11). A final channel estimator 620 derives output channel taps $h_o(n)$ for a second CIRE based on the input channel taps $h_i(n)$, the channel tap energies E(n), and the noise energy $E_{noise}$, e.g., as shown in equation (12) or (13). Final channel estimator 620 may also filter the output channel taps, e.g., based on an IIR filter or some other type of filter.

Figure 7:
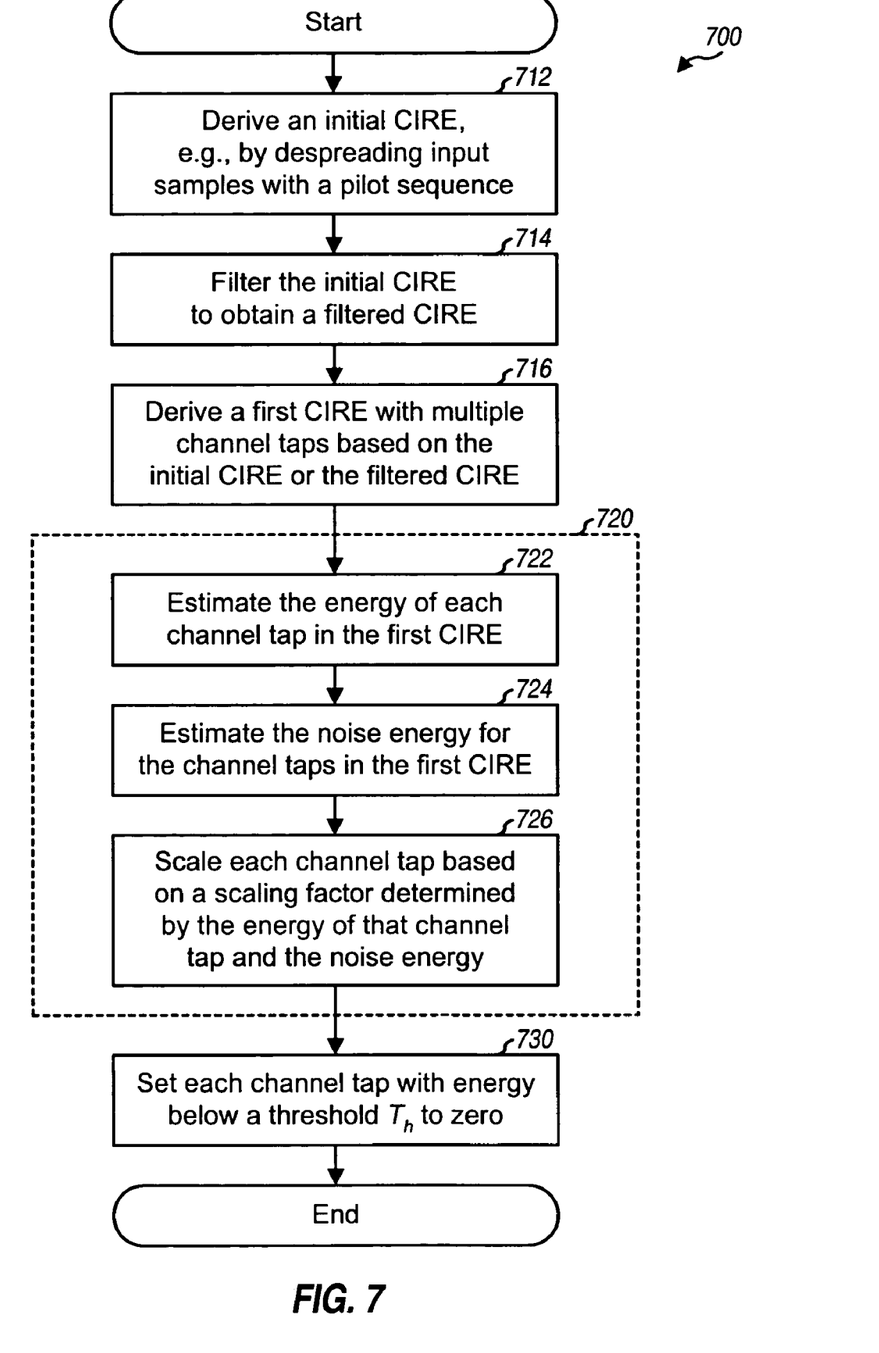
FIG. 7 shows a process for deriving a CIRE by scaling channel taps.

FIG. 7 shows a process 700 for deriving a CIRE by scaling channel taps. An initial CIRE is derived based on a received pilot, e.g., in the time domain by despreading input samples with a pilot sequence (block 712). The initial CIRE may be filtered to obtain a filtered CIRE (block 714). A first CIRE with multiple channel taps is derived based on the initial CIRE or the filtered CIRE (block 716). The channel taps in the first CIRE are scaled with multiple scaling factors to obtain a second CIRE (block 720).

In one embodiment of block 720, the energy of each channel tap in the first CIRE is estimated, e.g., as shown in equation (6) or (7) (block 722). The noise energy for the channel taps in the first CIRE is also estimated, e.g., based on the energies of a small number of channel taps on the left edge and/or right edge of the first CIRE (block 724). Each channel tap in the first CIRE is scaled based on a scaling factor determined by the energy of that channel tap and the noise energy, e.g., as shown in equation (12) (block 726). Each channel tap with energy below a threshold $T_h$ may be set to zero, e.g., as shown in equation (13) (block 730). The threshold $T_h$ may be set based on the noise energy or a predetermined value.

In a second post-processing scheme, the output channel taps in the second CIRE are obtained by zeroing out selected ones of the input channel taps in the first CIRE. The second scheme may be implemented in various manners.

In a first embodiment of the second scheme, the second CIRE has a length that is adaptively selected based on noise energy. For this embodiment, the left edge energy $E_{left}$, right edge energy $E_{right}$, and total energy $E_{total}$ of the first CIRE may be estimated as follows:

$$E_{left} = \sum_{n=1}^{P_{left}} E(n), \qquad \text{Eq (14)}$$

$$E_{right} = \sum_{n=L-P_{right}+1}^{L} E(n), \text{ and} \qquad \text{Eq (15)}$$

$$E_{total} = \sum_{n=1}^{L} E(n), \qquad \text{Eq (16)}$$

where $P_{left}$ and $P_{right}$ are the numbers of channel taps used to compute the left edge and right edge energies, respectively. In general, $P_{left}$ may or may not be equal to $P_{right}$. As an example, L may be equal to 64, and $P_{left}$ and $P_{right}$ may both be equal to 15. $P_{left}$ and $P_{right}$ may be fixed values or configurable values and may be selected to achieve good performance. E(n) may be the instantaneous energy of input channel tap $h_i(n)$, as shown in equation (6), or the average energy of $h_i(n)$, as shown in equation (7). The left edge energy $E_{left}$ may also be determined based on a first subset of channel taps on the left edge of the CIRE, and the right edge energy $E_{left}$ may be determined based on a second subset of channel taps on the right edge of the CIRE. Each subset may include any number and any ones of the channel taps on the associated edge.

The $P_{left}$ channel taps on the left edge are zeroed out if the left edge energy is lower than a threshold $T_{left}$ and are retained otherwise, as follows:

$$h_o(n) = \begin{cases} h_i(n) & \text{if } E_{left} < T_{left} \\ 0 & \text{otherwise} \end{cases} \qquad \text{Eq (17)}$$

for $n = 1, \ldots, P_{left}$.

Similarly, the $P_{right}$ channel taps on the right edge are zeroed out if the right edge energy is lower than a threshold $T_{right}$ and are retained otherwise, as follows:

$$h_o(n) = \begin{cases} h_i(n) & \text{if } E_{right} < T_{right} \\ 0 & \text{otherwise} \end{cases} \qquad \text{Eq (18)}$$

for $n = L - P_{right} + 1, \ldots, L$.

The thresholds $T_{left}$ and $T_{right}$ may be set based on the total energy $E_{total}$. For example, $T_{left}$ and $T_{right}$ may be set as $T_{left} = T_{right} = \beta_1 \cdot E_{total}$, where $\beta_1$ may be set to 0.05 or some other value. $T_{left}$ and $T_{right}$ may also be programmable values.

In a second embodiment of the second scheme, input channel taps are successively zeroed out in a predetermined order, one channel tap at a time, until a certain fraction of the total energy is removed. For this embodiment, an index j indicates the number of input channel taps being considered and runs from 1 through L, or j=1, 2, ..., L. The input channel taps may be considered one at a time, e.g., starting from the ends and working toward the middle, and alternating between the two ends. An index j' indicates which input channel tap to consider and may be defined based on index j, as follows:

$$j'=(j+1)/2 \text{ for odd j, and} \qquad \text{Eq (19)}$$

$$j'=L-(j-2)/2 \text{ for even j.} \qquad \text{Eq (20)}$$

Index j' selects input channel taps on the two ends first and alternates between the right and left edges. Hence, j'=1, L, 2, L−1, 3, L−2, . . . , L/2, L/2+1 as index j goes from 1 through L.

The accumulated energy $E_{acc}(j)$ for j input channel taps may be expressed as:

$$E_{acc}(j)=E_{acc}(j-1)+E(j'), \qquad \text{Eq (21)}$$

where E(j') is the estimated energy of input channel tap $h_i(j')$, which may be derived as shown in equation (6) or (7), and $E_{acc}(j)$ may be initialized as $E_{acc}(0)=0$.

For each value of j, input channel tap $h_i(j')$ is selected, and the accumulated energy $E_{acc}(j)$ is updated with the energy E(j') of the selected channel tap. Input channel tap $h_i(j')$ is zeroed out if the updated accumulated energy $E_{acc}(j)$ is lower than a threshold $T_{acc}$ and is retained otherwise, as follows:

$$h_o(j') = \begin{cases} h_i(j') & \text{if } E_{acc}(j) < T_{acc} \\ 0 & \text{otherwise} \end{cases} \quad \text{Eq (22)}$$

for $j = 1, \ldots, L$.

The threshold $T_{acc}$ may be set based on the total energy $E_{total}$. For example, $T_{acc}$ may be set as $T_{acc} = \beta_{acc} \cdot E_{total}$, where $\beta_{acc}$ may be set to 0.05 or some other value. $T_{acc}$ may also be a programmable value.

In a third embodiment of the second scheme, weak input channel taps are successively zeroed out in a predetermined order, one channel tap at a time, until a certain fraction of the total energy is removed. For this embodiment, index j may run from 1 through L. For each value of j, input channel tap $h_i(j')$ may be considered as weak if its energy $E(j')$ is below a threshold $T_h$. If input channel tap $h_i(j')$ is weak, then (1) the accumulated energy $E_{acc}(j)$ is updated to include the energy of this channel tap and (2) this channel tap is zeroed out if the updated accumulated energy is below a threshold $T_{acc}$. Input channel tap $h_i(j')$ is retained if it is not weak or if the updated accumulated energy is not below the threshold $T_{acc}$. The thresholds $T_h$ and $T_{acc}$ may be set based on the noise energy $E_{noise}$, the total energy $E_{total}$, and so on, or may be programmable values.

In a fourth embodiment of the second scheme, the input channel taps are ordered from weakest to strongest and are successively zeroed out in a sequential order, one channel tap at a time, until a certain fraction of the total energy is removed. For this embodiment, index j may run from 1 through L. For each value of j, the weakest channel tap among all input channel taps that have not been considered is selected, and the accumulated energy $E_{acc}(j)$ is updated to include the energy of the selected channel tap. The selected channel tap is zeroed out if the updated accumulated energy is below a threshold $T_{acc}$ and is retained otherwise. The threshold $T_{acc}$ may be set based on the total energy $E_{total}$ or may be a programmable value.

In a fifth embodiment of the second scheme, weak initial channel taps are zeroed out. An input channel tap may be considered as weak if its energy is below a threshold $T_h$. In an embodiment, the threshold $T_h$ is set based on the total energy $E_{total}$, e.g., as $T_h = \beta_{ht} \cdot E_{total}$, where $\beta_{ht}$ may be set to 0.01 or some other value. In another embodiment, the threshold $T_h$ is set based on the noise energy $E_{noise}$, e.g., as $T_h = \beta_{hn} \cdot E_{noise}$ where $\beta_{hn}$ may be set to 1.5 or some other value. In yet another embodiment, the threshold $T_h$ is set based on the energy $E_{peak}$ of the largest input channel tap, e.g., as $T_h = \beta_{hp} E_{peak}$, where $\beta_{hp}$ may be set to 0.01 or some other value. The threshold $T_h$ may also be set based on some other quantity or may be a programmable value.

Various embodiments for selectively zeroing out input channel taps have been described above. The input channel taps may also be zeroed out in other manners, and this is within the scope of the invention.

Referring back to FIG. 6, final channel estimator 620 receives the input channel taps $h_i(n)$, which may be the initial channel taps $\tilde{h}(n)$ or the filtered channel taps $\tilde{h}(n)$. Final channel estimator 620 may also receive the channel tap energies $E(n)$, edge energies $E_{left}$ and/or $E_{right}$, total energy $E_{total}$, noise energy $E_{noise}$, and so on. Final channel estimator 620 may derive one or more thresholds based on the received energies and/or programmable values. Final channel estimator 620 may then zero out selected ones of the input channel taps based on any one or any combination of the embodiments described above.

Figure 8:
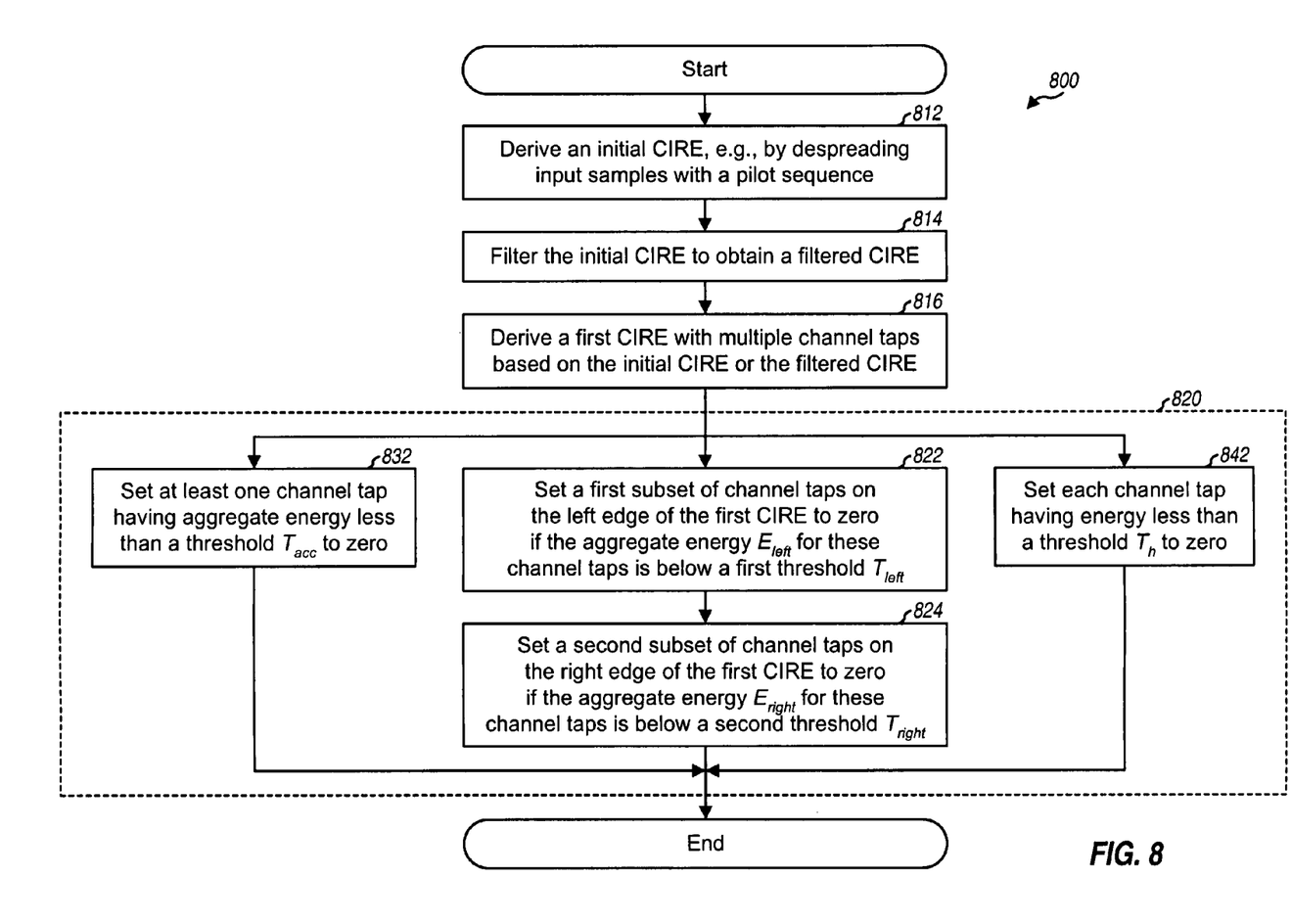
FIG. 8 shows a process for deriving a CIRE by selectively zeroing out channel taps.

FIG. 8 shows a process 800 for deriving a CIRE by selectively zeroing out channel taps. An initial CIRE is derived based on a received pilot, e.g., in the time domain by despreading input samples with a pilot sequence (block 812). The initial CIRE may be filtered to obtain a filtered CIRE (block 814). A first CIRE with multiple channel taps is derived based on the initial CIRE or the filtered CIRE (block 816). Selected ones of the channel taps in the first CIRE are set to zero to obtain a second CIRE (block 820).

For the first embodiment described above, a first subset of channel taps on the left edge of the first CIRE is set to zero if the aggregate energy $E_{left}$ for these channel taps is below a first threshold $T_{left}$ (block 822). A second subset of channel taps on the right edge of the first CIRE is also set to zero if the aggregate energy $E_{right}$ for these channel taps is below a second threshold $T_{right}$ (block 824). The first and second subsets may include the same or different numbers of channel taps. Each subset may include a certain fraction (e.g., approximately one fourth) of the total number of channel taps in the first CIRE. The first threshold may be equal to the second threshold, and both thresholds may be set based on the total energy of the channel taps in the first CIRE.

For the second, third, and fourth embodiments described above, at least one channel tap having aggregate energy less than a threshold $T_{acc}$ is set to zero (block 832). The threshold $T_{acc}$ may be set based on the total energy of the channel taps in the first CIRE. For the second and third embodiments, the channel tap(s) to be zeroed out are selected in a predetermined order, alternating between the left and right edges of the first CIRE, and traversing from the two ends toward the middle. For the fourth embodiment, the channel taps in the first CIRE are ranked from weakest to strongest, and the channel tap(s) to be zeroed out are selected in a sequential order starting with the weakest channel tap. For the fifth embodiment, each channel tap having energy less than a threshold $T_h$ is set to zero (block 842). The threshold $T_h$ may be set based on the noise energy, the peak energy, or the total energy of the channel taps in the first CIRE.

The input channel taps may also be processed based on both the first and second post-processing schemes. For example, the input channel taps may be zeroed out based on any of the embodiments described above, and the input channel taps that are not zeroed out may be scaled based on the tap-wise LMMSE technique.

The second CIRE may be used to derive coefficients for an equalizer, as shown in FIG. 4. The second CIRE may also be used for a rake receiver. A rake receiver includes multiple finger processors (or simply, "fingers"), and each finger may be assigned to process a signal instance of interest. The second CIRE may be used to identify strong signal instances to be assigned for processing by the fingers. The second CIRE may also be used to weight the outputs of the assigned fingers prior to combining these outputs.

The channel estimation techniques described herein may be implemented by various means. For example, these techniques may be implemented in hardware, firmware, software, or a combination thereof. For a hardware implementation, the processing units used to perform channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 292 in FIG. 2) and executed by a processor (e.g., processor 290). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to derive a first channel impulse response estimate (CIRE) having multiple channel taps, and to scale the multiple channel taps with multiple scaling factors to obtain a second CIRE; and
a memory coupled to the at least one processor,
wherein the at least one processor is configured to estimate energy of each of the multiple channel taps, to estimate noise energy for the multiple channel taps, to scale each of the multiple channel taps based on a scaling factor determined by the energy of the channel tap and the noise energy, and to estimate the noise energy based on an average energy of at least one channel tap on left edge and at least one channel tap on right edge of the first CIRE.

2. The apparatus of claim 1, wherein the at least one processor is configured to set each channel tap with energy below a threshold to zero.

3. The apparatus of claim 2, wherein the at least one processor is configured to set the threshold based on the noise energy.

4. The apparatus of claim 1, wherein the at least one processor is configured to estimate the noise energy based on energies of at least one channel tap on at least one edge of the first CIRE.

5. The apparatus of claim 1, wherein the at least one processor is configured to determine a first energy value for at least one channel tap on left edge of the first CIRE, to determine a second energy value for at least one channel tap on right edge of the first CIRE, and to estimate the noise energy based on a lower of the first and second energy values.

6. The apparatus of claim 1, wherein the at least one processor is configured to derive the first CIRE by despreading input samples with a pilot sequence.

7. The apparatus of claim 1, wherein the at least one processor is configured to derive an initial CIRE based on input samples and to filter the initial CIRE to obtain the first CIRE.

8. The apparatus of claim 1, wherein the at least one processor is configured to derive coefficients for an equalizer based on the second CIRE and to filter input samples with the coefficients.

9. The apparatus of claim 1, wherein the at least one processor is configured to use the second CIRE for a rake receiver.

10. A method of channel estimation by a wireless communication device comprising:
using a processor, deriving a first channel impulse response estimate (CIRE) having multiple channel taps; and
scaling the multiple channel taps with multiple scaling factors to obtain a second CIRE,
wherein the scaling the multiple channel taps comprises estimating energy of each of the multiple channel taps, estimating noise energy for the multiple channel taps, and scaling each of the multiple channel taps based on a scaling factor determined by the energy of the channel tap and the noise energy, and wherein estimating noise energy is based on an average energy of at least one channel tap on left edge and at least one channel tap on right edge of the first CIRE.

11. The method of claim 10, wherein the estimating the noise energy comprises estimating the noise energy based on energies of at least one channel tap on at least one edge of the first CIRE.

12. The method of claim 10, further comprising: setting each channel tap with energy below a threshold to zero.

13. An apparatus comprising:
means for deriving a first channel impulse response estimate (CIRE) having multiple channel taps; and
means for scaling the multiple channel taps with multiple scaling factors to obtain a second CIRE,
wherein the means for scaling the multiple channel taps comprises means for estimating energy of each of the multiple channel taps, means for estimating noise energy for the multiple channel taps, and means for scaling each of the multiple channel taps based on a scaling factor determined by the energy of the channel tap and the noise energy, and wherein means for estimating the noise energy comprises means for estimating the noise energy based on an average energy of at least one channel tap on left edge and at least one channel tap on right edge of the first CIRE.

14. The apparatus of claim 13, wherein the means for estimating the noise energy comprises means for estimating the noise energy based on energies of at least one channel tap on at least one edge of the first CIRE.

15. The apparatus of claim 13, further comprising: means for setting each channel tap with energy below a threshold to zero.

16. An apparatus comprising:
at least one processor configured to derive in time domain a first channel impulse response estimate (CIRE) having multiple channel taps, and to set selected ones of the multiple channel taps to zero to obtain a second CIRE; and
a memory coupled to the at least one processor,
wherein the at least one processor is configured to select the at least one channel tap in a predetermined order, alternating between left and right edges of the first CIRE, and traversing from two ends of the first CIRE toward middle of the first CIRE.

17. The apparatus of claim 16, wherein the at least one processor is configured to derive the first CIRE in the time domain by despreading input samples with a pilot sequence.

18. The apparatus of claim 16, wherein the at least one processor is configured
to determine a first energy value for a first subset of channel taps on a left edge of the first CIRE,
to determine a second energy value for a second subset of channel taps on a right edge of the first CIRE, to set the first subset of channel taps to zero if the first energy value is below a first threshold, and to set the second subset of channel taps to zero if the second energy value is below a second threshold.

19. The apparatus of claim 18, wherein the at least one processor is configured to determine total energy of the multiple channel taps in the first CIRE, and to derive the first and second thresholds based on the total energy.

20. The apparatus of claim 18, wherein the first and second subsets include equal number of channel taps, and wherein the first threshold is equal to the second threshold.

21. The apparatus of claim 16, wherein the at least one processor is configured to determine aggregate energy of at least one channel tap among the multiple channel taps, and to set the at least one channel tap to zero if the aggregate energy is less than a threshold.

22. The apparatus of claim 21, wherein the at least one processor is configured to determine total energy of the multiple channel taps in the first CIRE, and to set the threshold based on the total energy.

23. The apparatus of claim 21, wherein the at least one processor is configured to rank the multiple channel taps from weakest to strongest and to select the at least one channel tap in a sequential order starting with the weakest channel tap.

24. An apparatus comprising:
at least one processor configured to derive in time domain a first channel impulse response estimate (CIRE) having multiple channel taps, and to set selected ones of the multiple channel taps to zero to obtain a second CIRE; and
a memory coupled to the at least one processor,
wherein the at least one processor is configured to set each of the multiple channel taps having energy less than a threshold to zero, and
wherein the at least one processor is configured to determine peak energy among the multiple channel taps and to set the threshold based on the peak energy.

25. The apparatus of claim 24, wherein the at least one processor is further configured to estimate noise energy based on energies of at least one channel tap on at least one edge of the first CIRE, and to set a threshold based on the noise energy.

26. A method of channel estimation by a wireless communication device comprising:
using a processor, deriving in time domain a first channel impulse response estimate (CIRE) having multiple channel taps; and
setting selected ones of the multiple channel taps to zero to obtain a second CIRE,
wherein the setting selected ones of the multiple channel taps to zero comprises setting each of the multiple channel taps having energy less than a threshold to zero where the threshold is based on peak energy of the multiple channel taps.

27. The method of claim 26, wherein the setting selected ones of the multiple channel taps to zero further comprises:
determining a first energy value for a first subset of channel taps on left edge of the first CIRE,
determining a second energy value for a second subset of channel taps on right edge of the first CIRE,
setting the first subset of channel taps to zero if the first energy value is below a first threshold, and
setting the second subset of channel taps to zero if the second energy value is below a second threshold.

28. The method of claim 26, wherein the setting selected ones of the multiple channel taps to zero further comprises:
determining aggregate energy of at least one channel tap among the multiple channel taps, and
setting the at least one channel tap to zero if the aggregate energy is less than a threshold.

29. An apparatus comprising:
means for deriving in time domain a first channel impulse response estimate (CIRE) having multiple channel taps; and
means for setting selected ones of the multiple channel taps to zero to obtain a second CIRE, including means for setting each of the multiple channel taps having energy less than a threshold to zero where the threshold is based on peak energy of the multiple channel taps.

30. The apparatus of claim 29, wherein the means for setting selected ones of the multiple channel taps to zero further comprises:
means for determining a first energy value for a first subset of channel taps on left edge of the first CIRE,
means for determining a second energy value for a second subset of channel taps on right edge of the first CIRE,
means for setting the first subset of channel taps to zero if the first energy value is below a first threshold, and
means for setting the second subset of channel taps to zero if the second energy value is below a second threshold.

31. The apparatus of claim 29, wherein the means for setting selected ones of the multiple channel taps to zero further comprises:
means for determining aggregate energy of at least one channel tap among the multiple channel taps, and
means for setting the at least one channel tap to zero if the aggregate energy is less than a threshold.

* * * * *